Figure 1:
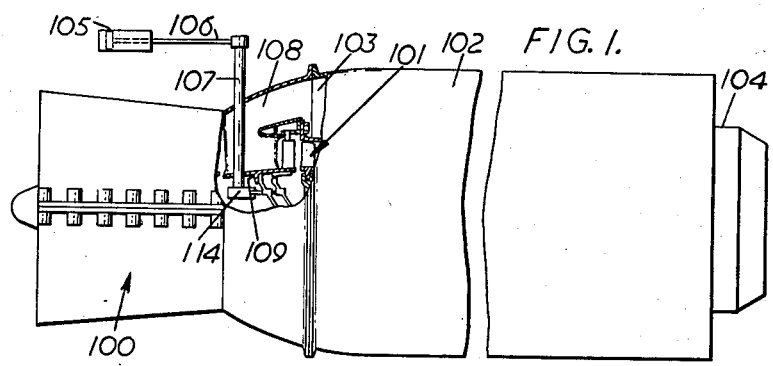

June 25, 1963  D. McLEAN ETAL  3,095,010
GAS TURBINE ENGINE HAVING ADJUSTABLE GUIDE VANES
Filed April 21, 1960  2 Sheets-Sheet 1

Inventors
DONALD McLEAN
NELSON HECTOR KENT
THOMAS STEEL
By
Cushman, Darby & Cushman
Attorneys

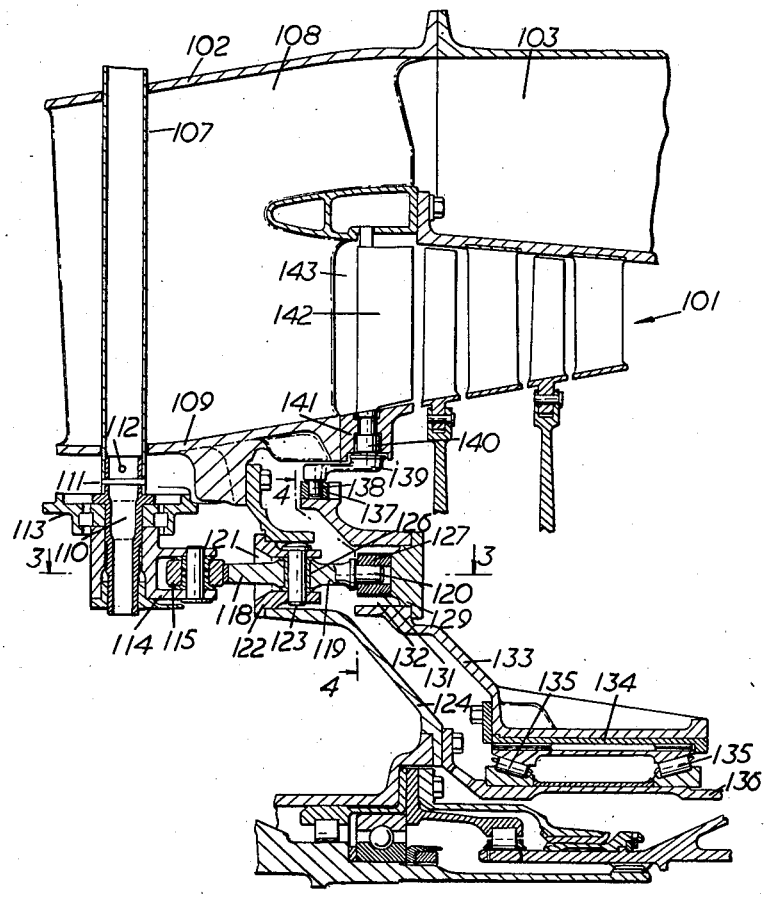

United States Patent Office 3,095,010
Patented June 25, 1963

3,095,010
GAS TURBINE ENGINE HAVING ADJUSTABLE GUIDE VANES
Donald McLean and Nelson Hector Kent, Derby, and Thomas Steel, Littleover, Derby, England, assignors to Rolls-Royce Limited, Derby, England, a company of Great Britain
Filed Apr. 21, 1960, Ser. No. 23,804
Claims priority, application Great Britain July 7, 1959
3 Claims. (Cl. 137—601)

This invention concerns improvements in or relating to gas turbine engines.

According to the present invention a gas turbine engine comprises a compressor or a turbine provided with pivotally mounted guide vanes, a rotatably mounted vane operating device rotation of which effects pivotal movement of said guide vanes, a lever mounted for pivotal movement in a plane at right angles to the plane of rotation of the vane operating device, one arm of said lever having a sliding connection with said vane operating device, and means engaging the other arm of the lever for effecting pivotal movement of the lever and hence pivotal movement of the guide vanes.

Preferably the said one arm of the lever is slidably mounted in a bushing, said bushing being rotatably mounted in said vane operating device. The said other arm of the lever may be engaged by means carried by a rotatably mounted shaft, power means being provided for effecting rotation of said shaft.

The said vane operating device may be disposed inwardly of the guide vanes, the said power means being disposed externally of the engine and said shaft passing through a fluid duct of the engine in such a way as to cause no obstruction or substantially no obstruction, to fluid flow through said duct. Thus the shaft may pass through a hollow, vane-shaped strut which extends across said fluid duct.

Preferably the gas turbine engine is of the by-pass type in which a portion of the air compressed by a compressor of the engine is passed into a by-pass duct which is disposed around, so as to by-pass, the combustion equipment and turbine of the engine, the said shaft causing no obstruction, or substantially no obstruction, to compressed air flow through the by-pass duct. Thus the gas turbine engine may be provided with a low pressure and a high pressure compressor, the by-pass duct being supplied with compressed air from the low pressure compressor and the said guide vanes being inlet guide vanes of the high pressure compressor.

Thus, in the case of the said by-pass engine, the strut may be disposed immediately upstream of the inlet end of the by-pass duct. By this means obstruction of the main annular fluid duct of the engine (and also of the by-pass duct in the case of a by-pass engine) may readily be avoided, since such vane shaped struts must in any case be provided between the engine casing and the inner wall of the engine.

The vane operating device may comprise a rotatably mounted operating ring to which the vanes are connected by cranks, the axis of the ring being coincident with that of the engine.

Figure 3:
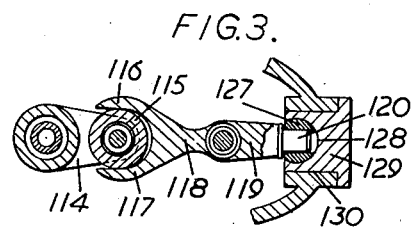
Figure 4:
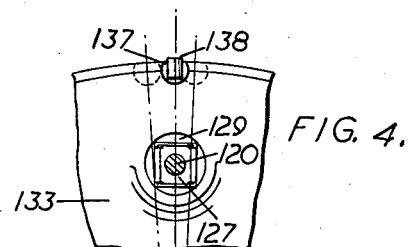

The invention is illustrated, merely by way of example, in the accompanying drawings, in which:

FIGURE 1 is a diagrammatic elevation of a gas turbine, jet reaction engine according to the present invention, FIGURE 2 is a sectional elevation of part of the engine shown in FIGURE 1, and FIGURES 3 and 4 are respectively sections taken on the lines 3—3 and 4—4 of FIGURE 2.

Referring to the drawings, a gas turbine, jet reaction, by-pass engine for use in propelling an aircraft comprises in flow series a low pressure compressor 100, a high pressure compressor 101, combustion equipment, and high and low pressure turbines, the combustion equipment and turbines not being shown but being disposed within an engine casing 102.

The upstream, or inlet, end of an annular by-pass duct 103 communicates with a space between the low and high pressure compressors 100, 101 so as to derive a supply of compressed air from the low pressure compressor 100. The compressed air flowing through the by-pass duct 103 by-passes the high pressure compressor 101, the combustion equipment, and the high and low pressure turbines and is discharged as an annular stream about the turbine exhaust gases which are discharged through a jet pipe 104.

Mounted externally of the engine is a hydraulically or pneumatically operated ram 105 to whose piston rod 106 there is pivotally connected a link (not shown). The link is mounted at the outer end of a rotatably mounted tubular operating shaft 107. The shaft 107 extends radially of the engine and passes through a hollow vane-shaped strut 108, the vane 108 serving to space the engine casing 102 from an inner wall 109.

The inner end of the operating shaft 107 has mounted within it an extension portion 110 (FIGURE 2) which is secured to the shaft 107 by pins 111, 112. The extension portion 110 is rotatably mounted in a member 113 which is carried by the inner wall 109.

The extension portion 110 has splined onto it an axially extending arm 114 which carries a roller 115. The roller 115 is engaged by the forked ends 116, 117 (FIGURE 3) of one arm 118 of a lever whose other arm 119 is provided at its outer end with a pin 120.

The lever 118, 119 passes through an axially extending hole 121 in a tubular member 122 which is mounted firmly within a hole 123 in a fixed wall structure 124. The tubular member 122 has a radially extending pin 125 mounted therein, the pin 125 being mounted within a bushing 126 disposed centrally of the lever 118, 119. The lever 118, 119 is thus mounted for pivotal movement in a plane disposed at right angles to the plane of rotation of the compressor 101.

The pin 120 is slidably mounted in a part cylindrical bushing 127 which is rotatably mounted in a correspondingly shaped hole 128 in an insert 129 and which can slide radially in the hole 128. The insert 129 is formed with a reduced diameter portion 130 having diametrically opposed flats 131.

The reduced diameter portion 130 is mounted closely within a hole 132 in a substantially frusto-conical disc or flange 133 provided at the upstream end of a sleeve 134. The sleeve 134, whose axis is coincident with that of the engine, is mounted by roller bearings 135 about a tubular member 136 which is bolted to the fixed wall structure 124.

Mounted on the outer periphery of the disc 133 are a plurality of bushings 137 which are spaced from each other by equal angular intervals. Journalled in each of the bushings 137 is a pin 138 which forms part of a cranked lever 139. The lever 139 has a radially extending portion 140 which is journalled in a part 141 of the inner wall 109 of the engine. The portions 140 are respectively connected to inlet guide vanes 142 of the high pressure compressor 101.

When it is desired to rotate the inlet guide vanes 142 about their pivotal axes, the ram 105 is operated so as to effect rotation of the operating shaft 107. This effects pivotal movement of the arm 114 and hence pivotal movement of the lever 118, 119 in a plane at right angles to the plane of rotation of the disc 133. As will be clearly seen from FIGURE 4, such pivotal movement of the lever 118, 119 will rotate the disc 133 sufficiently to effect the required change in the disposition of the inlet guide vanes 142, the pin 120 sliding in the bushing 127 during movement of the said lever.

It will be appreciated that since a strut, such as the strut 108, must of necessity be provided to space the casing 102 from the inner wall 109 and since the operating shaft 107 passes through the hollow interior of this strut, pivotal movement of the inlet guide vanes 142 is effected by a mechanism which does not obstruct the gas flow either through the by-pass duct 103 or through the main annular fluid duct 143 of the engine.

We claim:

1. In a vane actuating mechanism for use in a gas turbine engine of a type having a plurality of pivotally adjustable, angularly spaced, radially extending guide vanes supported in an annular gas duct between coaxial inner and outer casings of the engine, said vane actuating mechanism comprising: a rotatably mounted vane operating ring disposed within the inner casing and rotatable about the axis of the duct for effecting pivoting movement to the guide vanes about their radial axes, a lever pivotally mounted about an axis extending radially relative to the axis of the duct, a substantially cylindrical bushing mounted in said vane operating ring with its axis extending radially relative to the axis of the duct, said bushing being pivotable about its axis and axially slidable in a radial direction in said vane operating ring, said lever having sliding engagement with said bushing, a rotatable operating shaft extending across the duct and operatively connected to said lever for pivoting the latter and rotating said vane operating ring to thereby pivot the guide vanes.

2. In a vane actuating mechanism for use in a gas turbine engine of the type having a plurality of pivotally adjustable, angularly spaced, radially extending guide vanes supported in an annular gas duct between coaxial inner and outer casings of the engine, said vane actuating mechanism comprising: a rotatably mounted vane operating ring disposed within said inner casing and rotatable about the axis of the duct for effecting pivoting movement of the guide vanes about their radial axes, a lever pivotally mounted about an axis extending radially relative to the axis of the duct, a substantially cylindrical bushing mounted in said vane operating ring with its axis extending radially relative to the axis of the duct, said bushing being pivotable about its axis and axially slidable in a radial direction in said vane operating ring, said lever having first and second ends disposed on opposite sides of its pivoting axis, said first end of said lever having sliding engagement with said bushing, a rotatable operating shaft extending across the duct, a crank disposed within the inner casing and carried by said operating shaft, said crank engaging said second end of said lever.

3. In a vane actuating mechanism for use in a gas turbine engine of the type having a plurality of pivotally adjustable, angularly spaced, radially extending guide vanes supported in an annular gas duct between coaxial inner and outer casings of the engine, said vane actuating mechanism comprising: a vane operating ring disposed within said inner casing, fixed structure connected to said inner casing and extending in spaced relationship inwardly of said inner casing and axially through the interior of said vane operating ring, said vane operating ring being disc-shaped and extending from closely adjacent said inner casing to closely adjacent said fixed structure, bearing means rotatably but non-axially movably mounting the vane operating ring on said fixed structure for rotation about the axis of the duct, said bearing means being the sole means for centering the vane operating ring about the axis of the duct, a crank arm operatively connected to each guide vane at the radially inner end thereof, a pin carried by each said crank arm, a plurality of angularly spaced bushings mounted in said vane operating ring, there being one bushing for each said pin, said pins being journalled in said bushings, whereby rotation of the vane operating ring effects pivoting movement of the guide vanes about their radial axes, a lever spaced radially inwardly of said inner casing and pivotally mounted in said fixed structure about an axis extending radially relative to the axis of the duct, a substantially cylindrical bushing mounted in said vane operating with its axis extending radially relative to the axis of the duct, said cylindrical bushing being pivotable about its axis and axially slidable in a radial direction in said vane operating ring, said lever having first and seconds ends disposed on opposite sides of its pivoting axis, said first end of said lever having sliding engagement with said cylindrical bushing, a rotatable operating shaft extending across the duct, a crank carried by said operating shaft and disposed within the inner casing, said crank engaging said second end of the lever.

References Cited in the file of this patent

UNITED STATES PATENTS

| 2,139,416 | McLane | Dec. 6, 1938 |
| 2,271,587 | Haynes | Feb. 3, 1942 |
| 2,337,861 | Adamtchik | Dec. 28, 1943 |
| 2,455,251 | Hersey | Nov. 30, 1948 |
| 2,672,726 | Wolf et al. | Mar. 23, 1954 |
| 2,715,814 | Barr | Aug. 23, 1955 |
| 2,803,943 | Rainbow | Aug. 27, 1957 |
| 2,870,956 | Dhonau et al. | Jan. 27, 1959 |
| 2,933,236 | Mathieson | Apr. 19, 1960 |

FOREIGN PATENTS

| 1,159,986 | France | Feb. 24, 1958 |
| 737,472 | Great Britain | Sept. 28, 1955 |
| 243,957 | Switzerland | Feb. 17, 1947 |
| 318,017 | Switzerland | Jan. 31, 1957 |